United States Patent
Garcia

(10) Patent No.: US 9,120,458 B2
(45) Date of Patent: Sep. 1, 2015

(54) AIRBAG WITH ADJUSTABLE SAFETY VALVE

(75) Inventor: Antonio Rovira Garcia, Barbera Del Valles (ES)

(73) Assignee: Manufacturas Goma, S.L., Barcelona (ES)

(*) Notice: Subject to any disclaimer, the term of this patent is extended or adjusted under 35 U.S.C. 154(b) by 0 days.

(21) Appl. No.: 13/878,710

(22) PCT Filed: Jun. 1, 2012

(86) PCT No.: PCT/ES2012/070411
§ 371 (c)(1),
(2), (4) Date: Apr. 10, 2013

(87) PCT Pub. No.: WO2013/178835
PCT Pub. Date: Dec. 5, 2013

(65) Prior Publication Data
US 2014/0375038 A1    Dec. 25, 2014

(30) Foreign Application Priority Data
Jun. 1, 2012   (WO) ................. PCT/ES2012/070411

(51) Int. Cl.
*B60R 21/239* (2006.01)
(52) U.S. Cl.
CPC .................... *B60R 21/239* (2013.01)
(58) Field of Classification Search
USPC ..................................... 280/736, 743.1, 742
IPC .................................................. B60R 21/239
See application file for complete search history.

(56) References Cited

U.S. PATENT DOCUMENTS

| | | | | |
|---|---|---|---|---|
| 5,492,363 A * | 2/1996 | Hartmeyer et al. | ............ | 280/739 |
| 5,704,639 A | 1/1998 | Cundill et al. | | |
| 5,725,244 A * | 3/1998 | Cundill | ......................... | 280/739 |
| 7,413,219 B2 * | 8/2008 | Neira Sarmiento et al. | .. | 280/739 |
| 7,543,849 B2 * | 6/2009 | Bradburn | ...................... | 280/739 |
| 7,740,274 B2 | 6/2010 | Manssart | | |
| 7,828,325 B2 * | 11/2010 | Pittiglio et al. | ............... | 280/739 |
| 7,874,584 B2 * | 1/2011 | Carvalho Marques | ....... | 280/739 |

(Continued)

FOREIGN PATENT DOCUMENTS

| | | |
|---|---|---|
| DK | 102008046264 | 7/2010 |
| EP | 1575810 A1 | 9/2005 |

(Continued)

OTHER PUBLICATIONS

International Search Report corresponding to International Application No. PCT/ES2012/070411 dated Nov. 2, 2013. (2 pages).

*Primary Examiner* — Faye M Fleming
(74) *Attorney, Agent, or Firm* — Banner & Witcoff, Ltd.

(57) ABSTRACT

Airbag with adjustable safety valve comprising a vent aperture made in the fabric of the airbag, at least one membrane of an elastic material attached to said fabric at a union area, said membrane being stretched across the width of said vent aperture and defining a variable area with an orifice that is smaller than the vent aperture, the orifice being deformed and growing with the pressure increase in the airbag, characterized in that between the variable area and the union areas, the membrane has a reinforcement area in the form of a containment ring with a greater thickness than that of the variable area, which controls the maximum aperture of the orifice.

17 Claims, 6 Drawing Sheets

(56) References Cited

U.S. PATENT DOCUMENTS

2007/0246922 A1* 10/2007 Manssart ............... 280/739
2008/0277912 A1* 11/2008 Denys et al. ............ 280/739

FOREIGN PATENT DOCUMENTS

| EP | 1842743 A2 | 10/2007 |
| GB | 2421932 A | 7/2006 |

* cited by examiner

AIRBAG WITH ADJUSTABLE SAFETY VALVE

The present application is a U.S. National Phase Application Under 35 USC §371 and applicant herewith claims the benefit of priority of PCT/ES2012/070411 filed Jun. 1, 2012, which is incorporated by reference herein in its entirety.

TECHNICAL FIELD OF THE INVENTION

The present invention belongs to the field of inflatable safety means, specifically airbags, that are mounted on vehicles and inflate in case of an imminent collision in order to protect the occupants.

Specifically, it belongs to the field of airbags provided with vent apertures fitted with adjustable safety valves that allow releasing the gas according to the needs of the collision.

BACKGROUND OF THE INVENTION

In case of collision the airbag will inflate with gas to absorb the energy from the occupants, increasing the pressure inside the airbag. To counteract this increase in pressure it is common to provide vent apertures directly in the airbag fabric.

It would be desirable for these apertures to be absent or to be very small until there is a significant pressure increase in the airbag.

In this sense, several solutions are known that allow releasing the gas in case of an excessive pressure increase in the airbag.

For example, U.S. Pat. No. 7,782,325, published on 9 Nov. 2010, describes an airbag provided with a vent aperture covered by a membrane that in turn defines an orifice with a diameter smaller than that of the vent aperture. When the pressure in the airbag increases, the diameter of said orifice in the membrane also increases, allowing the gas to be released and reducing the pressure inside the airbag.

This solution requires the periphery of said orifice to be defined by a region of increased membrane thickness, in order to minimise the risk of the membrane material breaking due to the pressure increase. However, this thickening of the internal edge of the membrane prevents the diameter of the orifice from increasing enough to efficiently counteract the overpressure in the airbag at the time it occurs.

In addition, U.S. Pat. No. 7,740,274, published on 22 Jun. 2010, discloses an airbag that includes a vent aperture allowing the gas contained in the airbag to be released upon impact. It comprises a complex series of membranes and/or a diaphragm disposed on the vent aperture that control the amount of gas released based on the pressure in the airbag.

Patent EP 1575810, published on 9 May 2007, discloses an airbag with a vent orifice covered by two ring-shaped pieces provided with radial slits in the area that is meant to cover the orifice partially, and a membrane for sealing said orifice placed between them. The sealing membrane is meant to break when the pressure in the airbag reaches a predetermined value.

In this solution, once the membrane has been broken at the time of the overpressure, it is no longer possible to reduce the size of the vent orifice created in said sealing membrane when the pressure inside the airbag is reduced.

DESCRIPTION OF THE INVENTION

In view of the foregoing, the present invention relates to an airbag with an adjustable safety valve.

The airbag comprises a vent aperture made in its fabric, and at least one membrane made of an elastic material placed across the width of said vent aperture. The membrane of elastic material is attached to said fabric of the airbag at a union area provided on its outer edge.

In turn, on the inner part the membrane defines a variable area with a smaller orifice than that of the vent aperture, which deforms and grows with the pressure increase inside the airbag.

Between the variable area and the union area, the membrane has a reinforcement area in the form of a containment ring with a greater thickness than the variable area. Said reinforcement area controls the maximum aperture of the orifice of the variable area, preventing the membrane material from breaking.

The novel structural configuration of the membrane described above allows adjusting the size of its orifice as required by the pressure increase in the airbag, without breaking the membrane material.

In addition, after the pressure increase in the airbag has been compensated, that is, as the pressure inside the airbag drops, the orifice of the membrane can recover its initial size, preventing the unnecessary release of the gas contained in the airbag.

BRIEF DESCRIPTION OF THE DRAWINGS

This specification is supplemented with a set of drawings illustrating the preferred embodiment, which are never intended to limit the invention.

DETAILED DESCRIPTION OF THE PREFERRED EMBODIMENT OF THE INVENTION

Figure 1:
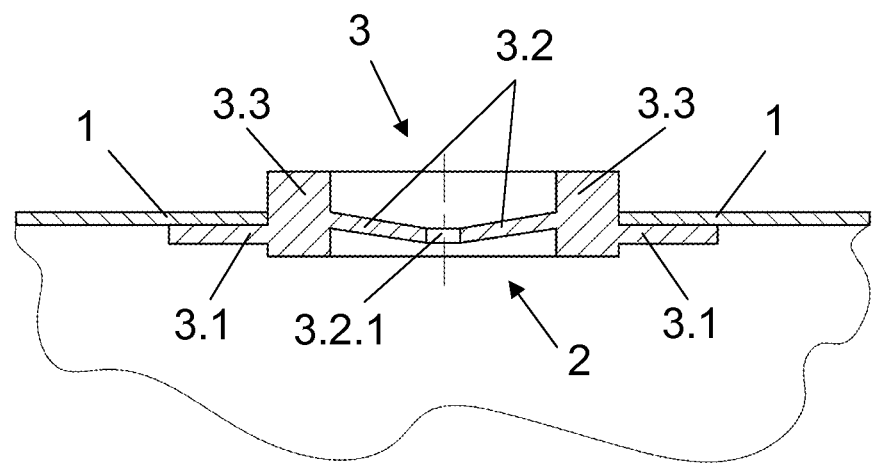
FIG. 1 shows a front cross-sectional and cutaway view of the airbag with the adjustable safety valve in the 'closed' position.

The present invention relates to an airbag with an adjustable safety valve.

The airbag comprises a vent aperture (2) made in the fabric (1) of the airbag. Across the width of said vent aperture (2) is stretched at least one membrane (3) of an elastic material.

Preferably, the membrane material is a silicone rubber or any other elastic material with a Shore A hardness from 20 to 80, elongation from 100% to 2500%, and breaking load from 50 to 280 kgf/cm$^2$.

The membrane (3) of elastic material is attached to said fabric (1) of the airbag at a union area (3.1) provided on its outer edge. The attachment of the membrane (3) to the fabric (1) of the airbag can be effected by any known technique, such as gluing, sewing, welding or the like.

On its inner part the membrane (3) defines a variable area (3.2) which includes an orifice (3.2.1) that is smaller than the vent aperture (2). The orifice (3.2.1) is deformed by and grows with the pressure increase in the airbag.

Figure 9:
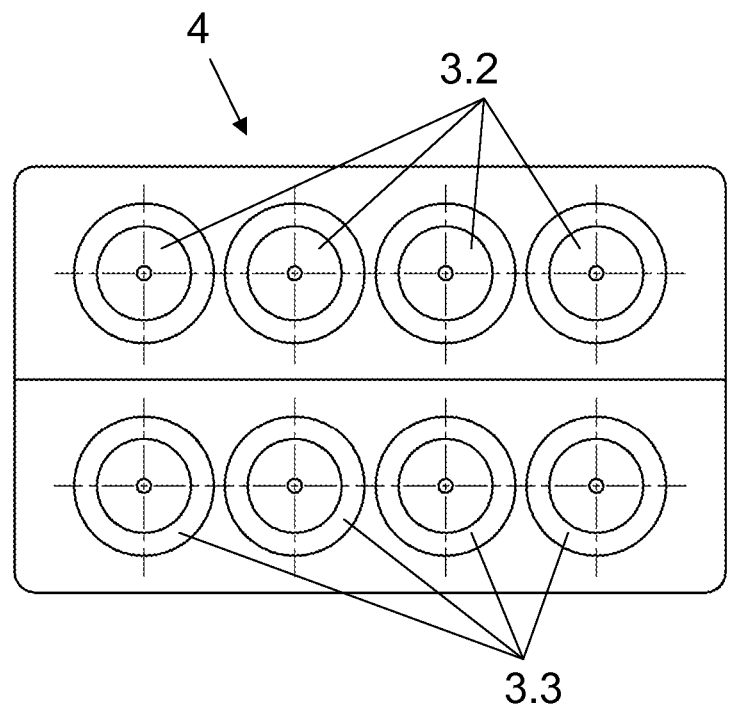
FIG. 9 shows a top view of the airbag variant of FIG. 1, with a plurality of membranes arranged in an array of four rows and two columns.
Figure 10:
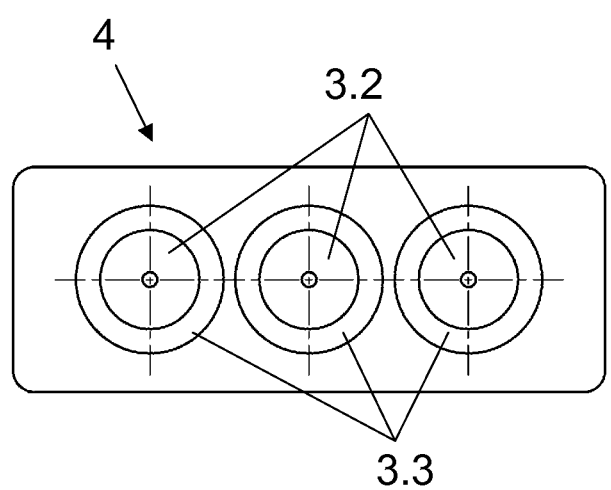
FIG. 10 shows a top view of the airbag variant of FIG. 1, with a plurality of membranes arranged in an array of one row and three columns.
Figure 11:
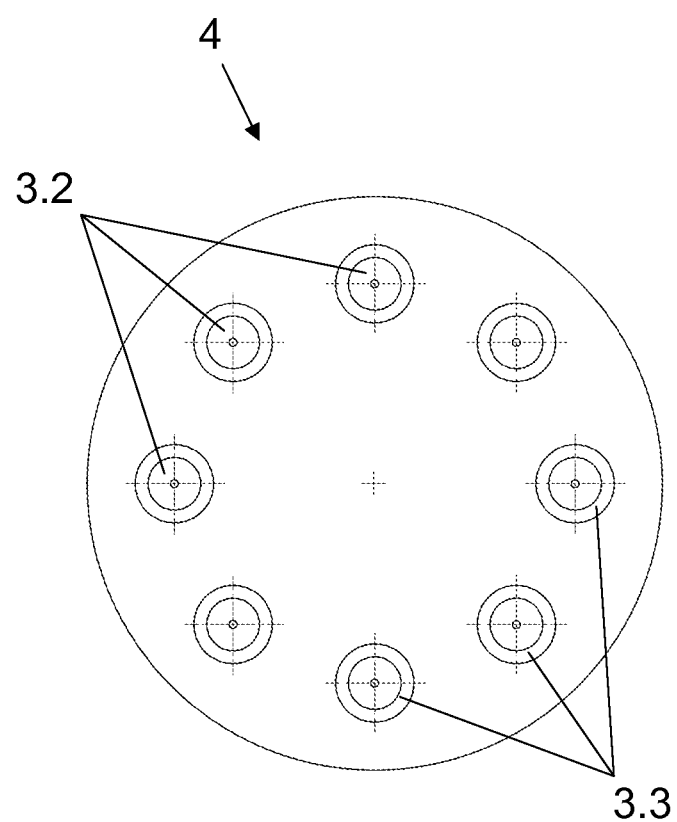
FIG. 11 shows a top view of the airbag variant of FIG. 1, with a plurality of membranes arranged circularly.

The airbag can comprise a single membrane (3) or, as shown in FIGS. 9, 10 and 11, a plurality of membranes (3) that form a group, in the sense that they are close to one another. In the latter case, for example, they could be arranged in an array (4) with two rows and four columns, as in FIG. 9, or in an array (4) with one row and three columns, as in the variant of FIG. 10. In addition, FIG. 11 shows the plurality of membranes (3) in a circular arrangement (4).

If the airbag has a single membrane (3), the diameter of the orifice (3.2.1) is preferably from 0.5 to 20 mm.

For the airbag variants with a plurality of membranes (3), preferably, the diameter of the orifice (3.2.1) of the variable area (3.2) of each membrane (3) will be from 0.5 to 5 mm.

Figure 2:
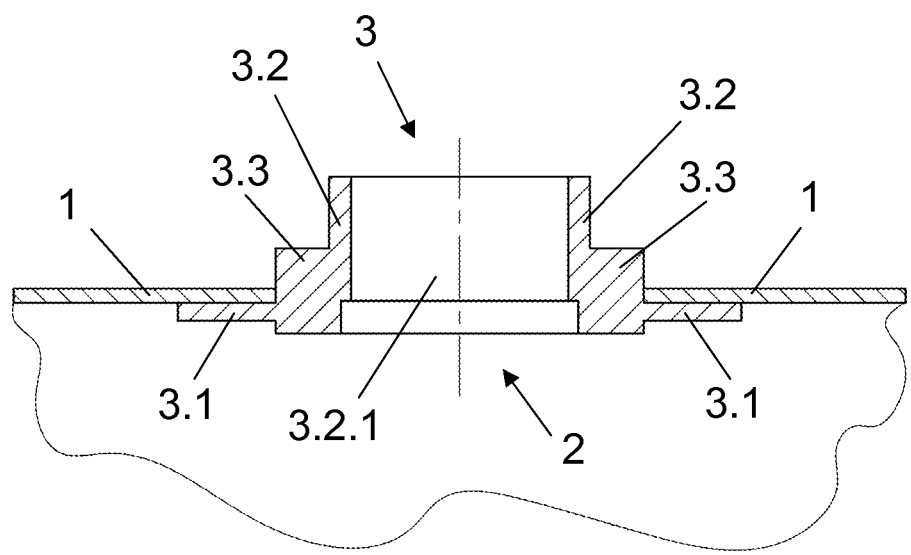
FIG. 2 shows a front cross-sectional and cutaway view of the airbag of FIG. 1, in the 'open' position.

As shown in FIGS. 1 and 2, between the variable area (3.2) and the union area (3.1), the membrane (3) comprises a reinforcement area (3.3). The thickness of the reinforcement area (3.3) is sufficiently greater than that of the variable area (3.2) to contain the expansion with respect to the thickness of said variable area (3.2).

The reinforcement area (3.3) is shaped as a containment ring, controlling the maximum aperture of the orifice (3.2.1).

The structural configuration of the membrane (3) allows adjusting the size of the orifice (3.2.1) as required by the pressure increase in the airbag, without breaking the material of the membrane (3).

Advantageously, the thickness of the membrane (3) in its variable area (3.2) is from 0.2 to 4 mm. This thickness can remain constant over the variable area (3.2) or decrease from the reinforcement area (3.3) to the orifice (3.2.1).

Additionally, the preferred thickness of the reinforcement area (3.3) of the membrane (3) is from 2 to 5 mm, at all times taking into account that said thickness of the reinforcement area (3.3) must be greater than the selected thickness for the variable area (3.2).

Figure 3:
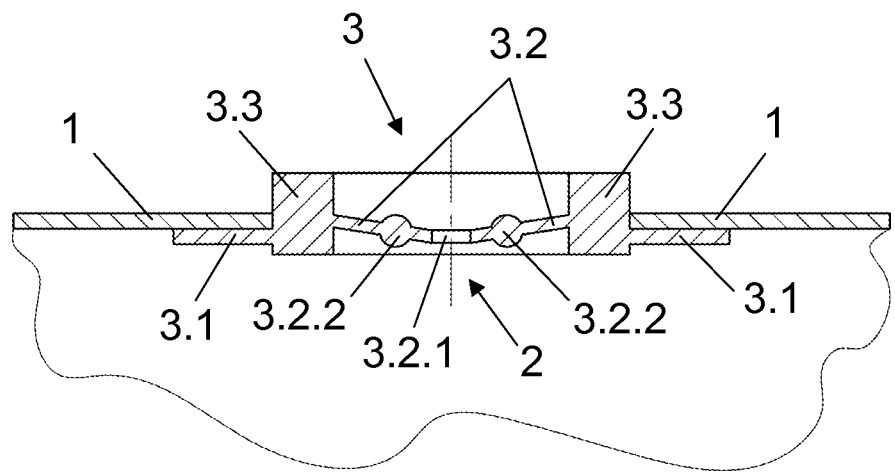
FIG. 3 shows a front cross-sectional and cutaway view of the airbag of FIG. 1, with the internal containment ring in the 'closed' position.
Figure 4:
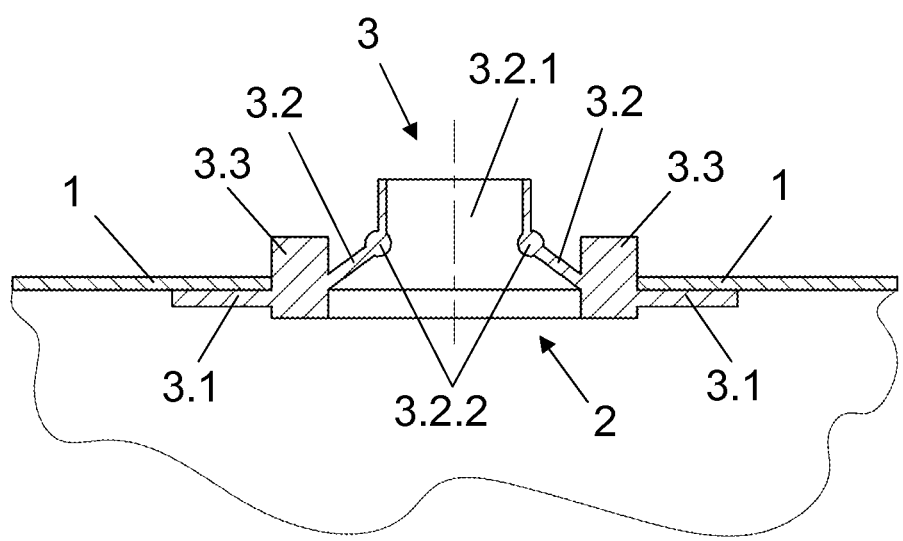
FIG. 4 shows a front cross-sectional and cutaway view of the airbag variant of FIG. 3, in the 'open' position.

As shown in FIGS. 3 and 4, in the variable area (3.2) of the membrane (3) the airbag can include a continuous inner containment ring (3.2.2) around the orifice (3.2.1) that limits the size of the latter.

Figure 5:
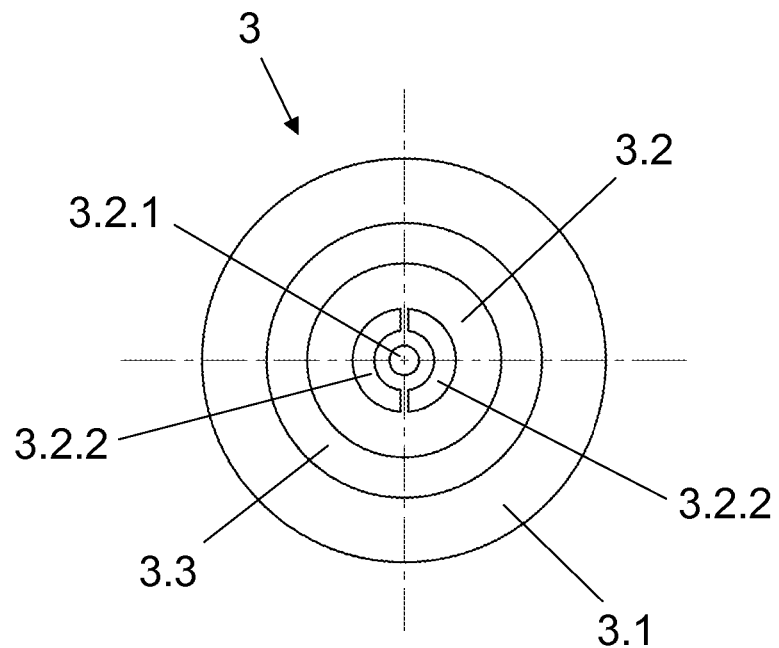
FIG. 5 shows a top view of the airbag variant of FIG. 3, with a discontinuous inner containment ring, divided into two 180° sectors.
Figure 6:
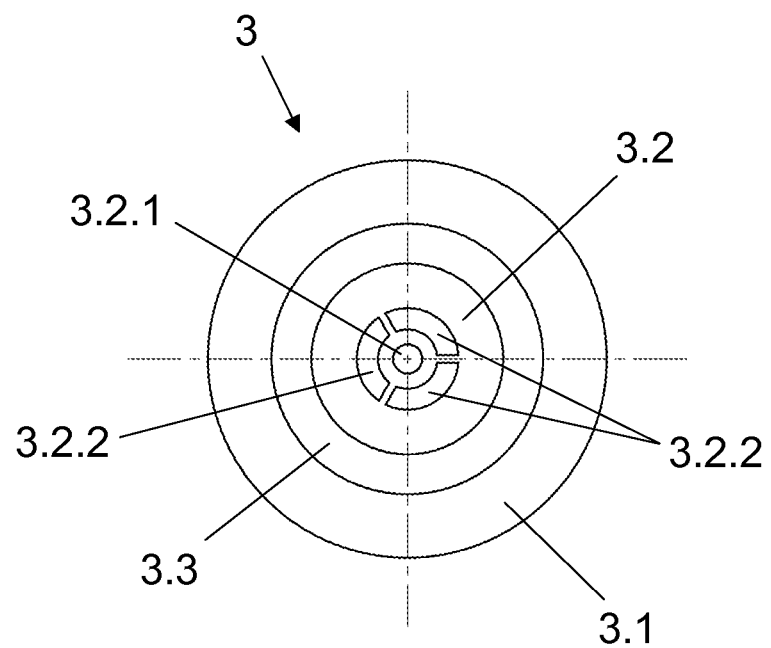
FIG. 6 shows a top view of the airbag variant of FIG. 3, with a discontinuous inner containment ring, divided into three 120° sectors.
Figure 7:
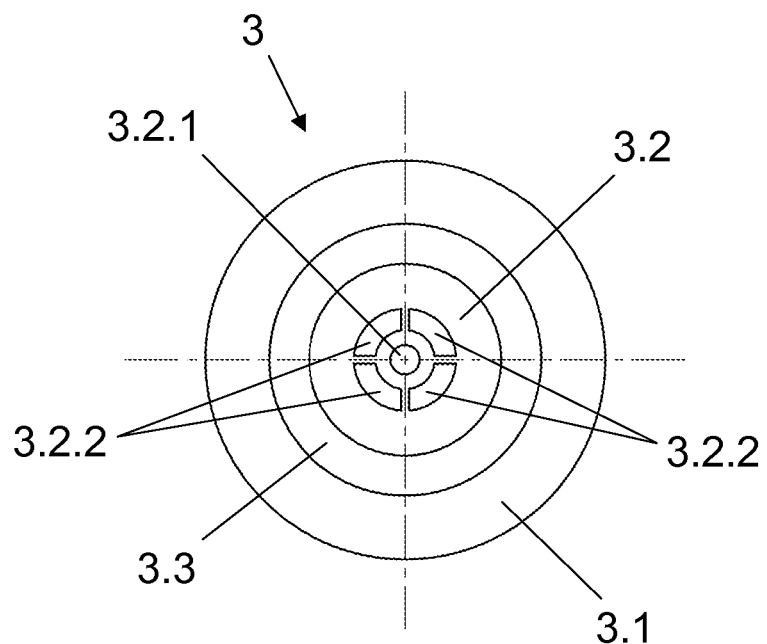
FIG. 7 shows a top view of the airbag variant of FIG. 3, with a discontinuous inner containment ring, divided into four 90° sectors.

The inner containment ring (3.2.2), as shown in FIGS. 5, 6 and 7, can be discontinuous, for example divided into two 180° sectors, three 120° sectors or four 90° sectors. The discontinuity in the structure of the inner containment ring (3.2.2) allows a cylindrical configuration of the orifice (3.2.1). Practically to the size of the vent aperture (2).

Figure 8:
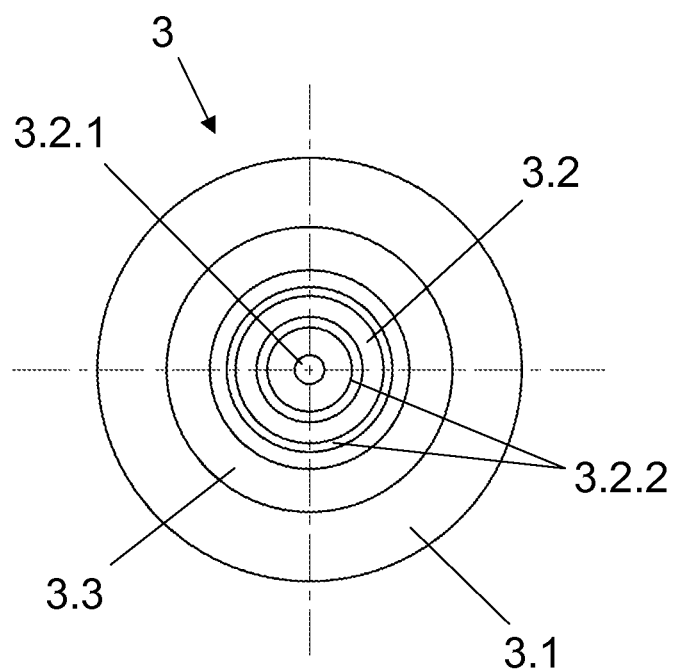
FIG. 8 shows a top view of the airbag variant of FIG. 3 with several inner containment rings.

In addition, as shown in FIG. 8, the airbag can comprise a plurality of inner containment rings (3.2.2) arranged concentrically in the variable area (3.2) of the membrane (3). This allows defining a maximum threshold pressure at which the orifice (3.2.1) should start growing and an upper limit for the pressure at which the opening will stop.

Preferably, the inner containment ring (3.2.2) has a thickness from 0.1 to 6 mm, depending on the thickness defined for the variable area (3.2).

If the airbag has a plurality of membranes (3), the inner containment rings (3.2.2) can be arranged in all or some of the variable areas (3.2) of the plurality of membranes (3).

The invention claimed is:

1. Airbag with an adjustable safety valve comprising a vent aperture made in the fabric of the airbag, and at least one membrane of an elastic material attached to said fabric at a union area,
    said membrane being stretched across the width of said vent aperture and defining a variable area with an orifice that is smaller than the vent aperture, the orifice being deformable and growing with the pressure increase in the airbag, wherein the membrane has a reinforcement area disposed between the variable area and the union area,
    the reinforcement area being in the form of a containment ring with a greater thickness than that of the variable area, the reinforcement area limits the maximum aperture of the orifice while the membrane stretches across the width of said vent aperture during pressure increase in the airbag.

2. Airbag according to claim 1, wherein the reinforcement area of the membrane has a thickness from 2 to 5 mm.

3. Airbag according to claim 1, wherein the elastic material has a Shore A hardness from 20 to 80, an elongation from 100% to 2500%, and a breaking load from 50 to 280 kgf/cm$^2$.

4. Airbag according to claim 3, wherein the elastic material is a silicone rubber.

5. Airbag according to claim 2, wherein the variable area of the membrane has a thickness from 0.2 to 4 mm.

6. Airbag according to claim 5, wherein the thickness of the variable area decreases from the reinforcement area to the orifice.

7. Airbag according to claim 1, 2, 5 or 6 having a single membrane.

8. Airbag according to claim 7, wherein the orifice of the variable area has a diameter from 0.5 to 20 mm.

9. Airbag according to claim 7, wherein the variable area of the membrane has an inner containment ring around the orifice.

10. Airbag according to claim 9, wherein the inner containment ring has a thickness from 0.1 to 6 mm.

11. Airbag according to claim 7, wherein the variable area of the membrane has a plurality of inner containment rings arranged concentrically around the orifice.

12. Airbag according to claims 1, 2, 5 or 6 having a plurality of membranes.

13. Airbag according to claim 12, wherein the plurality of membranes are arranged in an array with two rows and four columns.

14. Airbag according to claim 12, wherein the plurality of membranes are arranged in an array with one row and three columns.

15. Airbag according to claim 12 wherein the plurality of membranes are placed in a circular arrangement.

16. Airbag according to claim 12, wherein the orifice of the variable area of each membrane has a diameter from 0.5 to 5 mm.

17. Airbag according to claim 12, wherein the inner containment ring is placed in some of the variable areas of the plurality of membranes.

* * * * *